United States Patent
Finkel et al.

(10) Patent No.: US 10,438,012 B2
(45) Date of Patent: Oct. 8, 2019

(54) INTERFACE TO GENERATE DATA COMPATIBLE WITH AN EXTERNAL SYSTEM IN AN OIL AND GAS ASSET SUPPLY CHAIN

(71) Applicant: SICPA HOLDING SA, Prilly (CH)

(72) Inventors: Charles Finkel, New York, NY (US); Mark Campbell, Lausanne (CH); Christophe Van Ngoc Ty, Genève (CH); Giorgio Caset, Le Mont-sur-Lausanne (CH)

(73) Assignee: SICPA HOLDINGS SA, Prilly (CH)

( * ) Notice: Subject to any disclaimer, the term of this patent is extended or adjusted under 35 U.S.C. 154(b) by 204 days.

(21) Appl. No.: 15/301,572

(22) PCT Filed: Apr. 4, 2014

(86) PCT No.: PCT/US2014/033027
§ 371 (c)(1),
(2) Date: Oct. 3, 2016

(87) PCT Pub. No.: WO2015/152944
PCT Pub. Date: Oct. 8, 2015

(65) Prior Publication Data
US 2017/0116434 A1    Apr. 27, 2017

(51) Int. Cl.
*G06F 21/62* (2013.01)
*G06Q 50/06* (2012.01)
*G08B 13/00* (2006.01)

(52) U.S. Cl.
CPC ......... *G06F 21/6218* (2013.01); *G06Q 50/06* (2013.01); *G08B 13/00* (2013.01)

(58) Field of Classification Search
CPC ...... G06F 21/6218; G06F 21/62; G06F 21/64; G06Q 50/06; H04Q 9/00; G08B 13/00;
(Continued)

(56) References Cited

U.S. PATENT DOCUMENTS

| 4,551,719 A | 11/1985 | Carlin et al. |
| 7,881,869 B2 * | 2/2011 | Clayton ............. G05B 23/0262 702/18 |

(Continued)

OTHER PUBLICATIONS

International Search Report and Written Opinion issued with respect to application No. PCT/US2014/033027.
(Continued)

*Primary Examiner* — Kambiz Zand
*Assistant Examiner* — Alexander R Lapian
(74) *Attorney, Agent, or Firm* — Muncy, Geissler, Olds & Lowe, P.C.

(57) ABSTRACT

The present disclosure generally relates to an interface system and method of interfacing to generate data compatible with an external system in an oil and gas asset supply chain, and in particular to an interface and interface method for generating secure and verifiable data to prevent tampering, injection of unwanted data resulting from an unauthorized access along a supply chain. An interface generates and transforms data in an oil and gas supply chain for compatibility with external systems. Collected data is captured by an industrial control system sensor or data collector, which is transferred in a secure intermediary hardware platform to interface with a software component. The collected data is then modified using a business rules engine to create enhanced data and events created from the enhanced data.

15 Claims, 10 Drawing Sheets

(58) Field of Classification Search
CPC ........ G01D 4/002; G01D 4/004; G01D 4/006; H04L 9/32; H04L 9/3247
See application file for complete search history.

(56) References Cited

U.S. PATENT DOCUMENTS

| | | | |
|---|---|---|---|
| 2005/0083197 A1 | 4/2005 | Glenn et al. | |
| 2007/0139183 A1* | 6/2007 | Kates | G08B 25/005 340/521 |
| 2008/0069347 A1* | 3/2008 | Brown | H04L 9/3066 380/45 |
| 2010/0241848 A1* | 9/2010 | Smith | G01D 4/004 713/153 |
| 2011/0224935 A1* | 9/2011 | Hampel | G01D 4/004 702/85 |
| 2011/0308638 A1 | 12/2011 | Hyland et al. | |
| 2012/0158294 A1* | 6/2012 | Clements | G01N 1/2273 701/468 |
| 2013/0212214 A1* | 8/2013 | Lawson | G06Q 10/06315 709/217 |
| 2013/0291115 A1* | 10/2013 | Chong | G05B 19/4185 726/25 |
| 2014/0294178 A1* | 10/2014 | Toledo | G01R 22/063 380/255 |

OTHER PUBLICATIONS

Eurasia office action in counterpart Eurasian Application No. 201591359/31 dated Oct. 27, 2016 (and English language translation).
European Search Report from European Patent Office in counterpart European Application No. EP14888321 dated Aug. 9, 2017.
Eurasian office action in counterpart Eurasian Application No. 201591359/31 dated Jun. 8, 2017 (and English-language translation).

* cited by examiner

"EVENT SEQUENCE"

"WEAK PROBABILITY"

"EVENT SEQUENCE"

"MEDIUM PROBABILITY"

"EVENT SEQUENCE"

"HIGH PROBABILITY"

"EVENT SEQUENCE"

INTERFACE TO GENERATE DATA COMPATIBLE WITH AN EXTERNAL SYSTEM IN AN OIL AND GAS ASSET SUPPLY CHAIN

BACKGROUND

1. Field of the Disclosure

The present disclosure generally relates to a system and method for generating data compatible with an external system in an oil and gas asset supply chain, and in particular to an interface and interface method for generating secure and verifiable data to prevent tampering, or injection of unwanted data resulting from an unauthorized access along a supply chain.

2. Background Information

The oil and gas industry is typically divided into three sectors: upstream, midstream and downstream, as illustrated in FIG. 1. The upstream sector is known as the exploration and production sector. The upstream sector includes the searching and exploration for potential underground or underwater crude oil and natural gas fields (e.g. identification of potential hydrocarbon reserves), drilling of exploratory wells, and subsequently drilling and completion of the wells that recover and bring (produce) the crude oil and/or raw natural gas to the surface. The midstream sector involves the transportation (by pipeline, rail, truck, etc.), storage, and wholesale marketing of crude or refined petroleum products. Pipelines and other numerous transport systems can be used to move crude oil from production sites to refineries and deliver the various refined products to downstream distributors. The downstream sector refers to the refining of petroleum crude oil and the processing and purifying of raw natural gas, as well as the marketing and distribution of products derived from crude oil and natural gas. The downstream sector provides consumers with products such as gasoline or petrol, kerosene, jet fuel, diesel oil, heating, oil, lubricants, waxes, asphalt, natural gas, and liquefied petroleum gas as well as hundreds of petrochemicals.

In recent years, there has been a major increase of illegal activities related to oil and gas assets. For example, the number of oil and gas thefts in areas such as Texas and Mexico has increased nearly ten times in the past ten years. Corruption, theft, tampering, stealing and other such illegal activities occur along all phases and sectors of supply chain, including upstream, midstream and downstream. Pipeline taps, crude oil diversion, trucking hijacks, underground tunnels and stealing oil in refineries are just a few examples of the types of illegal activities that have become too prevalent within the industry. With this uptick in activity, there are several challenges faced by the oil and gas industry. For example, events that occur are not always related to one another geographically or otherwise, and provide a chain of fragmented events and incidents. Currently, many different solutions and technologies exist to assist in management, but they are not homogenous or compatible systems. A lack of coordinated communication and transparency among regions, functions and teams provides various challenges, and a lack of recordability and traceability of events stymies accountability. Thus, it becomes difficult to respond to such events and incidents in a timely manner, if at all.

As such, there exists a need to provide an intelligent management system that can address the need of monitoring and reporting or alerting illegal activities on oil and gas assets while at the same time increasing reliability, safety, regulatory compliance and environmental responsibility. Additionally, there is a need for a system that prescribes actions on the assets in the upstream, midstream and downstream sectors by remotely monitoring, analyzing, predicting events on this asset, and providing data as an alert to allow for decision making from any location. The term asset, as defined herein, includes all oil and gas products and infrastructure.

SUMMARY OF THE DISCLOSURE

The present disclosure, through one or more of its various aspects, embodiments, and/or specific features or sub-components, provides various systems, servers, methods, media, and programs for interfacing compiled codes, such as, for example, Java or data mining algorithms or mix of hardware and software elements to generate data with additional attributes useful in a Global Management System (GMS) related to management of oil and gas assets. The data with additional attributes are enhanced data which are used to create events useful to create in a specific module of the GMS clustered events.

The present disclosure generally relates to a system and method for collecting data from industrial control systems (ICS) and generating data compatible with an external system in an oil and gas asset supply chain, and in particular to an interface and interface method for generating secure and verifiable data to prevent tampering, or injection of unwanted data resulting from an unauthorized access along a supply chain.

In one embodiment, there is a method of generating data in an oil and gas supply chain for compatibility with external systems, including capturing collected data from at least one of an industrial control system, sensor and data collector; signing and storing the collected data in a secure intermediary hardware platform to interface with at least one software component; and adding attributes to the collected data using a business rules engine to create enhanced data.

In another embodiment, there is an interface generating data in an oil and gas supply chain for compatibility with external systems, including at least one of an industrial control system, sensor and data collector to capture collected data; a secure intermediary hardware platform signing and storing the collected data to interface with at least one software component; and a business rules engine adding attributes to the collected data to create enhanced data.

In still another embodiment, there is a non-transitory computer readable medium storing a program to generate data in an oil and gas supply chain for compatibility with external systems, the program when executed by a processor, including capturing collected data from at least one of an industrial control system, sensor and data collector; signing and storing the collected data in a secure intermediary hardware platform to interface with at least one software component; and adding attributes to the collected data using a business rules engine to create enhanced data.

In one aspect, the collected data is collected from at least one of an industrial control system, sensor and data collector.

In another aspect, the collected data is redundantly checked or acquired several times and averaged and verified from at least one of an industrial control system, sensor and data collector to confirm the accuracy of information in the collected data prior to being transferred to the secure intermediary hardware platform.

In still another aspect, the secure intermediary hardware platform is secured from at least one of tampering, injection of unwanted data and unauthorized access.

In yet another aspect, the additional attributes of the enhanced data include at least one of a secure attribute, allowing detection of modification or corruption and authentication.

In another aspect, at least one software component sends the enhanced data with the additional attributes to a data integration module in a secure manner.

In still another aspect, the business rules engine stores and queues the enhanced data, including the additional attributes, in an encrypted and persistent data storage.

In one aspect, the enhanced data with additional attributes interfaces with an external system.

In yet another aspect, the enhanced data could be received directly at a data integration module, from the plurality of industrial control systems and then collected and/or organized into clustered events in a global management system; in the part of the global management system preferably at a control center at least one of monitoring alerts is performed, creating alerts and decisions are provided based on the clustered events generated from the data managements system; at the control center, a visualization of the clustered events is displayed; and via the control center and communication with at least one of the data integration module, external operational support and personnel and resources can or will be performed.

In one aspect, the capturing and transferring of collected data uses system drivers to collect data from at least one of a physical source, programmable logic control and remote terminal units.

In still another aspect, the industrial control systems are for an upstream, midstream and downstream portion of a supply chain for the oil and gas assets.

In another aspect, each of the industrial control systems for the upstream, midstream and downstream portions are grouped as a single repository.

In yet another aspect, the collected data from each of the industrial control systems is provided to the secure intermediary platform in the form of at least one of: non-secure data, secure data, separately formatted data, commonly formatted data, data with secure attributes, read only data, and non-forgeable data.

In another aspect, interfacing includes communicating the collected data from the industrial control system to the data integration module via the secure intermediary hardware platform in a secure communication to ensure integrity of the collected data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
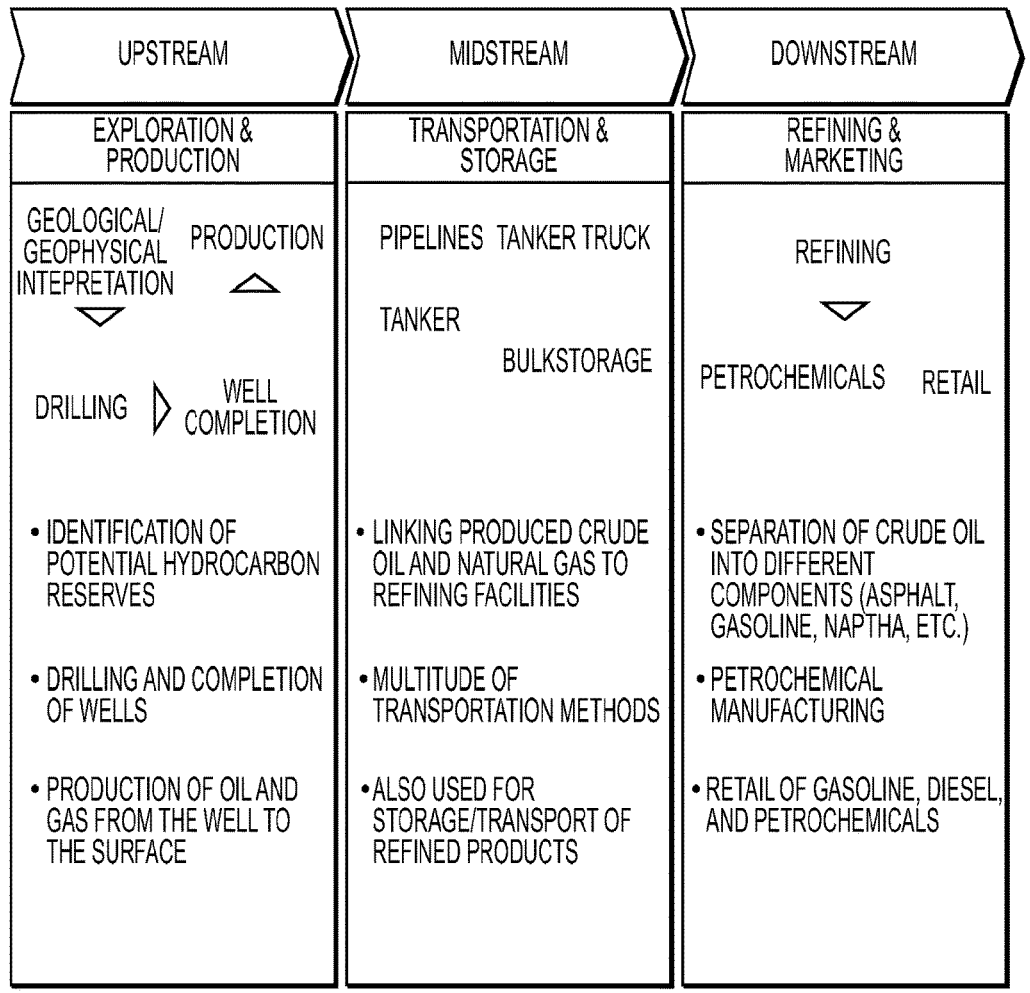
FIG. 1 is an exemplary supply chain for use in the oil and gas industry.
Figure 2:
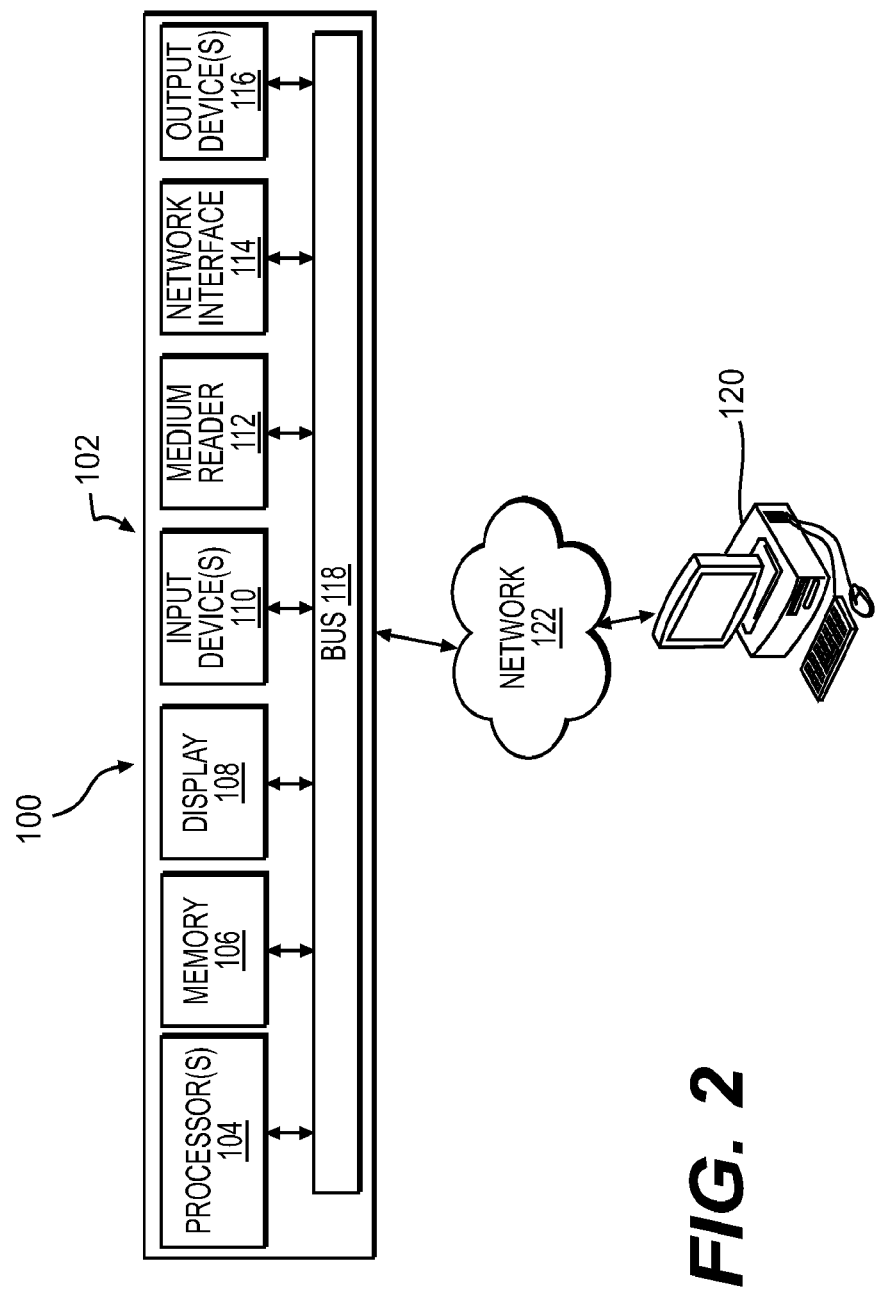
FIG. 2 is an exemplary system for use in accordance with the embodiments described herein.

FIG. 2 is an exemplary system for use in accordance with the embodiments described herein. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 2, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 2, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 2, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 2 as a wireless network. However, those skilled in the art appreciate that the network 122 may also be a wired network.

The additional computer device 120 is shown in FIG. 2 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, a television with one or more processors embedded therein and/or coupled thereto, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 3:
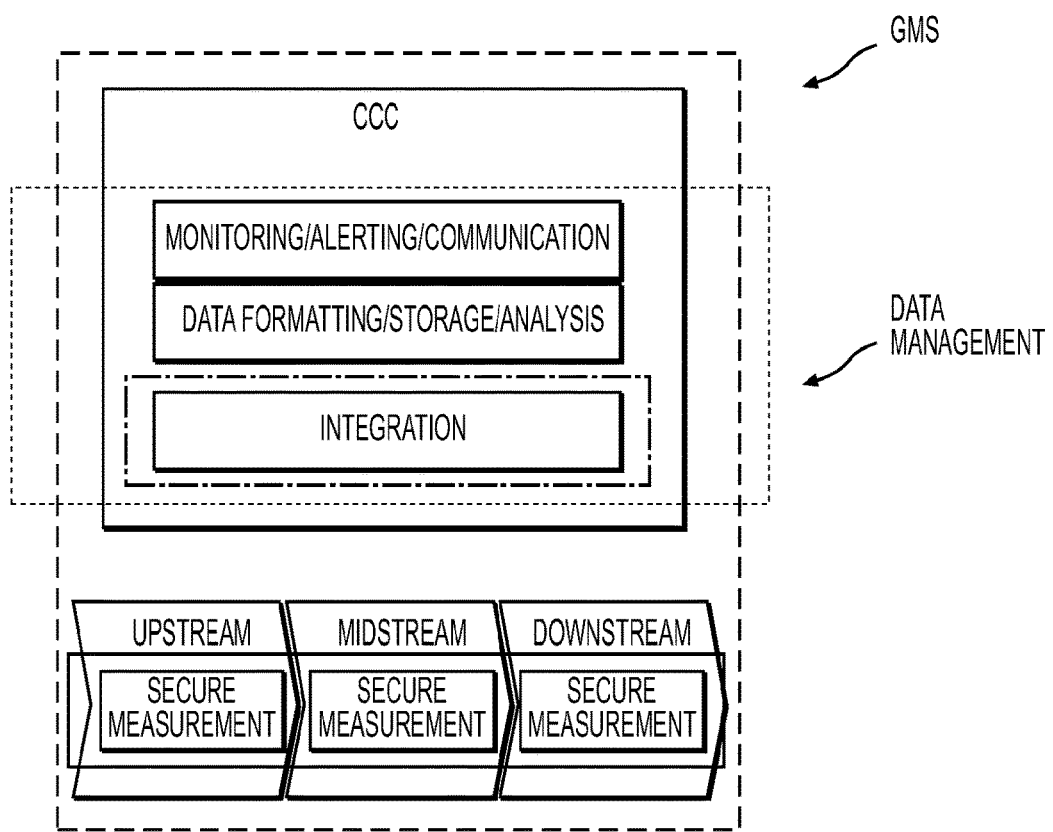
FIG. 3 is an exemplary diagram of a global management system in accordance with an embodiment of the disclosure.

FIG. 3 is an exemplary diagram of a global management system in accordance with an embodiment of the disclosure. The global management system GMS includes, but is not limited to, a control center CCC, a data management system, and sensors used for secure measurement. The global management system GMS manages oil and gas assets in a secure manner (or non-secure manner, if desirable) by monitoring for illegal activities on the supply chain, alerting authorities and/or authorized personnel and responding to the illegal activities in an appropriate manner. For example, the system may alert authorities and/or authorized personnel, provide a written report to police or emergency service personnel, forecast or predict data, provide recommendations and/or respond automatically. It is appreciated that the examples provided are non-limiting and that any number of responses may be provided as understood in the art. It is also appreciated that the global management system GMS is not limited to management of illegal activities, but may also be employed during emergencies, accidents, intervention or any other use typically contemplated by a management system. Additionally, as explained in detailed below, the control center CCC utilizes data over time to detect and calculate trends and future events in the clustered events. In this regard, personnel in the control center CCC may be alerted before such events occur when a specified level of probability is reached. Also, as discussed in more detail below, the control center CCC displays (e.g. LCD display) alerts (in addition to normal activity) which reflect events or incidents that are being monitored. The alerts may be used by personnel to contact emergency personnel or provide field intervention, and may by automatically supplied by the control center CCC if authorized personnel do not respond to such alerts within a given time period or after reoccurring alerts.

The global management system GMS is provided information from sensor(s) and data collector(s) located at various geographical positions and regions, and are in the form of any well known sensor or data collector capable of sensing or collecting data given the nature of the data that it is intending to capture. The sensors are configured to capture and collect data associated with the oil and gas assets traversing a supply chain, the data including, but not limited to, at least one of temperature, density, humidity, volume, gravity, chemical composition, pressure, weight, pressure variation of a pipeline, difference in weight of a vehicle or fuel volume, GPS localization, timing of a vehicle location, geographical region, flow rate, conductivity, rheology, turbidity, imaging, thermal imaging. Additionally the sensors may sense and collect, sensor status (i.e. fault functioning, disconnect, etc.), strain gauges, weather related data, traffic, vehicle or road condition, wind speed, barometric conditions, rainfall, maintenance data or maintenance date, personal position information (e.g. location of closest fireman or police facilities) radar, motion detectors, RF data, acoustic data, GPS position, data extracted from drones, stock value of petrol, etc. Information may also be collected by data collectors. For example, information and data contained in an SAP™ or Oracle™ repository which could be any data, forecast, purchase of products, tax value, etc.

Figure 6:
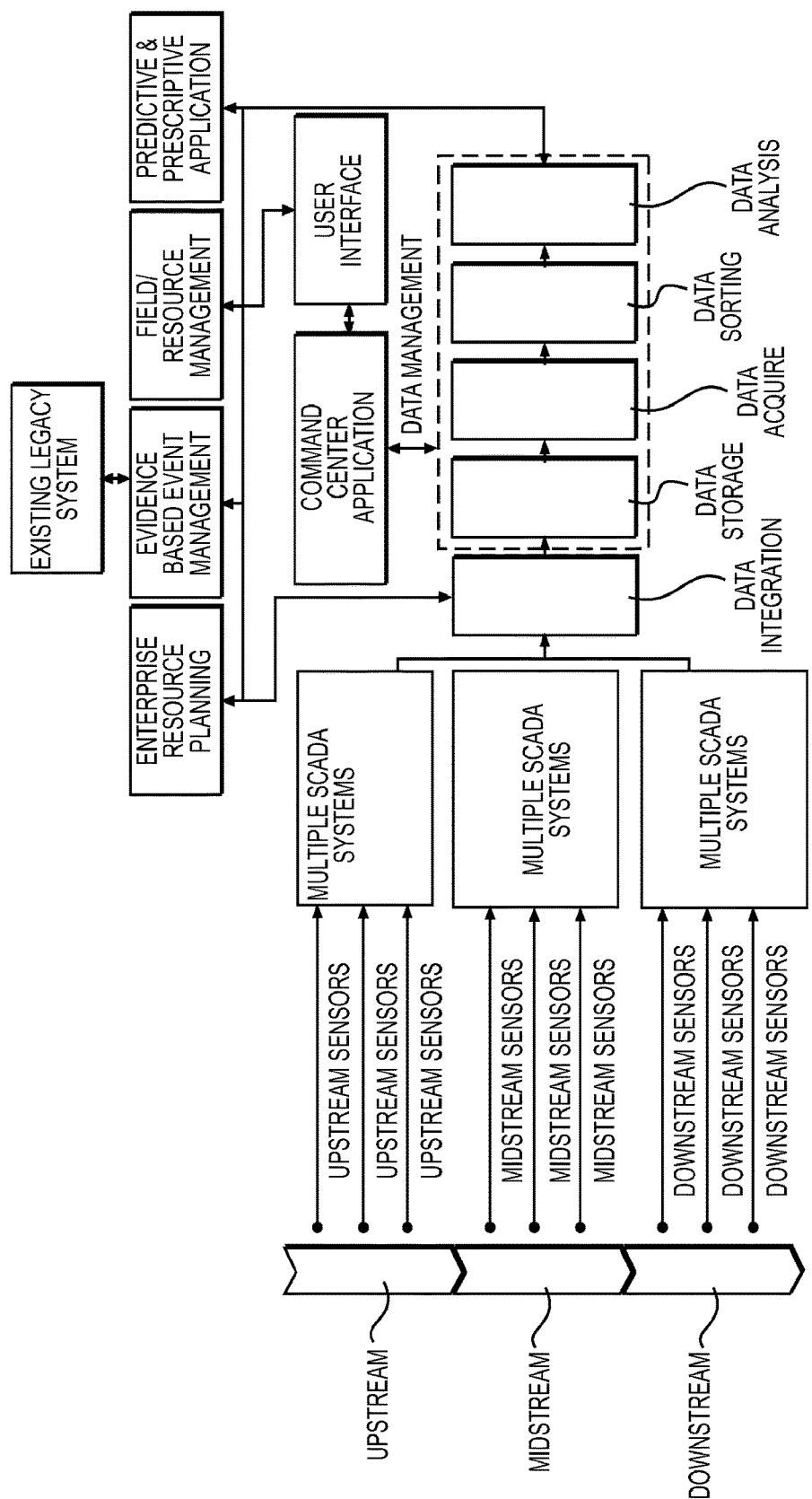
FIG. 6 is an exemplary diagram of a global management system in accordance with an embodiment of the disclosure.

Sensors and data collectors (sensing and collecting data in the form of secure measurements) may be located in the upstream sector, midstream sector and/or downstream sector of the oil and gas asset supply chain. The data are collected and sent to the gateway (FIG. 6). The gateway is a collector of data from a variety of sources (e.g. ICS such as SCADA, said ICS using protocols such as MODBUS, AS-iOPC, EtherCAT, etc.) and includes a business rules engine (BRE). The gateway may also collect data directly from the sensor, data collectors or any device providing data within the upstream, midstream and downstream sectors. The collected data may be transformed into secure (or additional secured) data that includes, for example, a timestamp and various attributes. Once the data is transformed by the gateway, the data is sent (preferably securely) to the data integration module. Additionally or alternatively, the collected data may be stored in a repository or multiple repositories and then sent the global management system GMS, where the clustered events will be generated from the data. It is also appreciated that the collected data need not come from the sources listed above, but may come from any internal or external source of data.

The data integration module includes a data management system that stores the data, acquires the data from storage, and creates a key value data structure from the data, sorts the structure data and analyzes the structured data using computational models and algorithms to identify events. The data is also checked for integrity of the structured data and the secureness of the structured data to prevent tampering. The clustered events are generated by the data management system for use by the control center CCC. The control center CCC (which may comprise processor(s), software, an interface(s), and multiple displays, and/or personnel to control and command information on the global management system GMS, and or, for example, any of the components described in FIG. 2, and which may be provided locally or remotely at any geographical location, mobile or otherwise) performs monitoring of events and alerts, creates alerts and provides decisions based on the clustered events generated from the data management system. The control center also provides communication with external operational support and personnel and resources.

The computations models and algorithms used in the global management system GMS are not limited to any particular model or algorithm. Rather, it is appreciated that any number of solutions may be used in this system. However, as an example, a data mining algorithm that is a set of heuristics and calculations that creates a data mining model from data. To create a model, the algorithm first analyzes the data provided and looks for types of patterns or trends. The algorithm uses the results of the analysis to define optimal parameters for creating the mining model. These parameters are then applied across the entire data set to extract actionable patterns and detailed statistics. The mining model that an algorithm creates from collected data can take various forms, including: a set of clusters (e.g. clustered events) that describe how the cases (e.g. events) in a dataset are related; a decision tree that predicts an outcome, and describes how different criteria affect that outcome. Using the data mined by the algorithms, the system is able to utilize historical data and improve accuracy over time. The accuracy may also be supplemented by human or drone verification at the location an event occurs, and using the alerts generated by the system.

Figure 4:
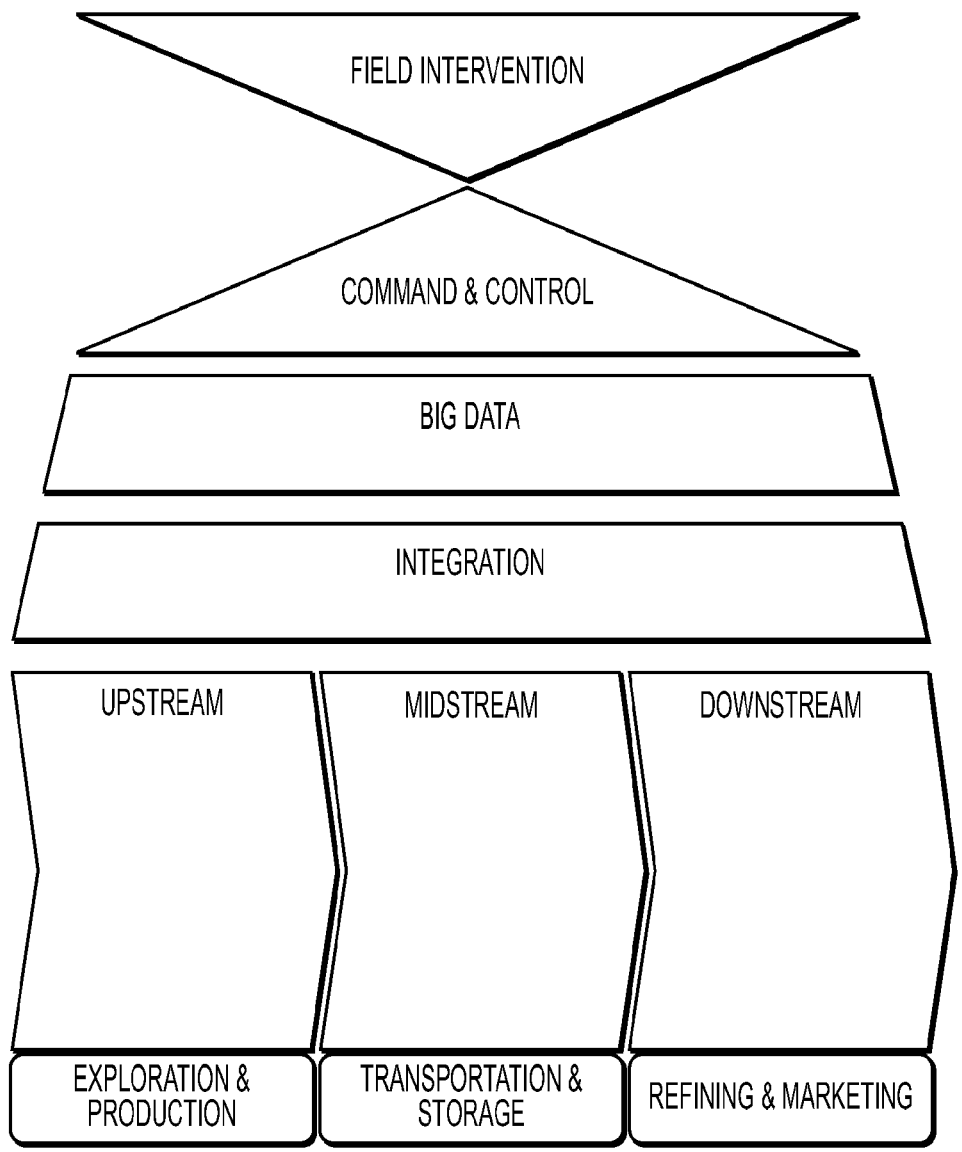
FIG. 4 is another exemplary diagram of a global management system in accordance with an embodiment of the disclosure.

FIG. 4 is another exemplary diagram of a global management system in accordance with an embodiment of the disclosure. The diagram illustrates a flow of data from the initial sensing and collecting of data at the upstream, midstream and downstream sectors all the way through any necessary field intervention that may occur as a result of the monitoring and alerts provided by the control center CCC. Within each stream (sector), there are multiple technologies, assets and generations of assets. These technologies are not consolidated and therefore not monitored together. The integration of the collected data interfaces between the various technologies and systems, provides communication between the technologies and systems that have different protocols and integrates external systems, such as ERPs and the like. The integrated data is formatted, stored and analyzed for use by the (command and) control center CCC. The control center CCC provides an overview of the collected data by monitoring the data provided by the data management system, alerting at the level of the control center (and personnel when necessary) of events or sequences of events and diagnosing and analyzing the data. To the extent necessary, intervention from security and emergency personnel, drones, remote cameras and any other resource capable of intervening or providing intervening measures will be contacted and informed of the control center CCC results. Data gathered and extracted by drones or videos cameras is stored in the repository(ies) of the system for use in future analysis.

Figure 5:
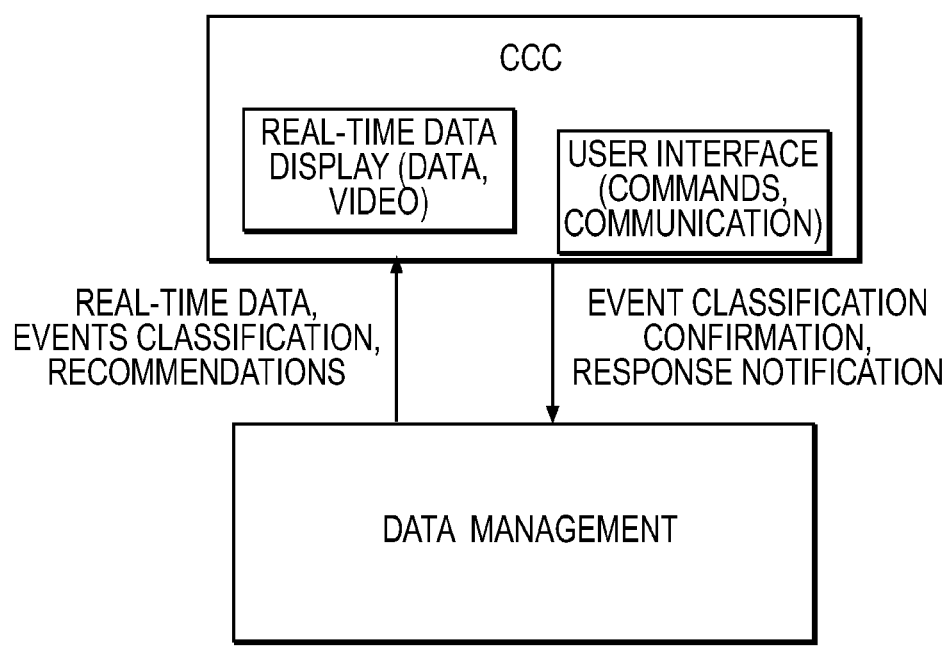
FIG. 5 illustrates an exemplary embodiment of communication between the data management system and the control center in accordance with an embodiment of the disclosure.

FIG. 5 illustrates an exemplary embodiment of communication between the data management system and the control center in accordance with an embodiment of the disclosure. The data management system provides real-time data, event classification and recommendations to the control center CCC based on collected data that has been analyzed, as described above and further below. The control center CCC confirms the event classifications and responds with a notification to the data management system, which may be securely logged with a timestamp. The control center CCC also performs monitoring of events and alerts, creates alerts and provides decisions based on the clustered events generated from the data management system. Notifications and alerts may be presented to, for example, personnel located at the control center CCC or remotely located using any number of interfaces. Interfaces can convey information as visual information, audible information, or in any other form, and may be conveyed using mobile devices as well as non-mobile devices. The control center also provides communication with external operational support and personnel and resources. For example, external operational support and personnel can provide field of intervention to verify whether alerts are accurate (e.g. whether an explosion occurs, material is stolen), and drones can be mobilized and sent to a specific region related to the alerts to verify and can provide visualization to enhance the value of the analysis of the clustered events.

FIG. 6 is an exemplary diagram of a global management system in accordance with an embodiment of the disclosure. The global management system GMS includes, but is not limited to, a control center CCC, a data management system, a data integration module, a user interface, a gateway interface, and sensors or data collectors used for capturing data from upstream, midstream and downstream. The global management system GMS may also include or extend to external resources such as ERPs, field and resource management, predictive and prescriptive applications, evidence based event management and existing legacy systems. It is appreciated that the global management system GMS is not limited to the disclosed components, nor must it include each of the components illustrated in the non-limiting and exemplary embodiment. For example, a supervisory control and data acquisition (ICS such as SCADA) system may replace the collection of data instead of the gateway interface. As noted above, data may be stored in a single repository or multiple repositories.

The global management system GMS manages oil and gas assets in a secure manner (or non-secure manner, if desirable) by monitoring for illegal activities on the supply chain, alerting authorities and/or authorized personnel and responding to the illegal activities in an appropriate manner. The global management system GMS collects the heterogeneous, unstructured and fragmented data from sensors, data collectors and monitoring sub-systems in the upstream, midstream and downstream oil and gas infrastructure (pipelines), to store and process the collected data using knowledge of the oil and gas infrastructure systems. The data is structured for additional processing and analysis, and the integrity of the structured data is verified and secured to prevent tampering. Eventually, as described above, the data is sent to the control center CCC for personnel to respond to theft or similar operational incidents. This process allows for a more rapid response than compared to current systems, as well as provide an evidential basis that constitutes material proof admissible in a court of law to support prosecution of criminal offenders. For example, drones may be used to provide on site evidence that an event has occurred.

More specifically, collected data will be acquired and processed in real-time and routed to the control center CCC (which may be in form of a physical command control center and/or an application operationally independent from personnel, or any combination thereof) for appropriate display to command center personnel. Structured data will be analyzed according to computational models and/or algorithms to identify events, where the events can be operational incidents such as those illegal activities described above and also operational problems, which may be identified and displayed to operators in real-time. In parallel (or at another time), the structured data and events may be entered into a prediction and prescriptive analysis module (predictive and prescriptive application) that uses machine learning, as described above, to identify sequences of measurements (FIG. 8A) or computed data that are classified as "events" that require some form of action and/or reporting. The classification of an event, previously supplied by the data management system, can be confirmed (by a human operator or machine) and the results sent to the prediction and prescription module to improve the training set for the learning algorithm, allowing it to "learn" over the course of time. Using machine learning, the global management system GMS will learn which series of event measurements taken together will indicate that a certain event or cluster of events has occurred. Using the "learned" events, the system is able to utilize historical data and improve accuracy over time. The accuracy may also be supplemented by human or drone verification at the location an event occurs, and using the alerts generated by the system.

The data management system, similar to the control center CCC, may also be in communication with the prediction and prescription module, which will use machine learning on structured data and events as learning sets to classify events, which can be understood as sequences of measurements. The prediction and prescription module provides information to identify probable events (at varying degrees) in the future, or events in progress that may be sent as events to the control center CCC. The prediction and prescription module can also prescribe the event response most likely to result in a positive outcome based on the history of events. Similarly, recognized (or known) trends that occur over the course of time may be used to improve the clustered events to more accurately generate the alerts in the control center CCC.

Figure 7:
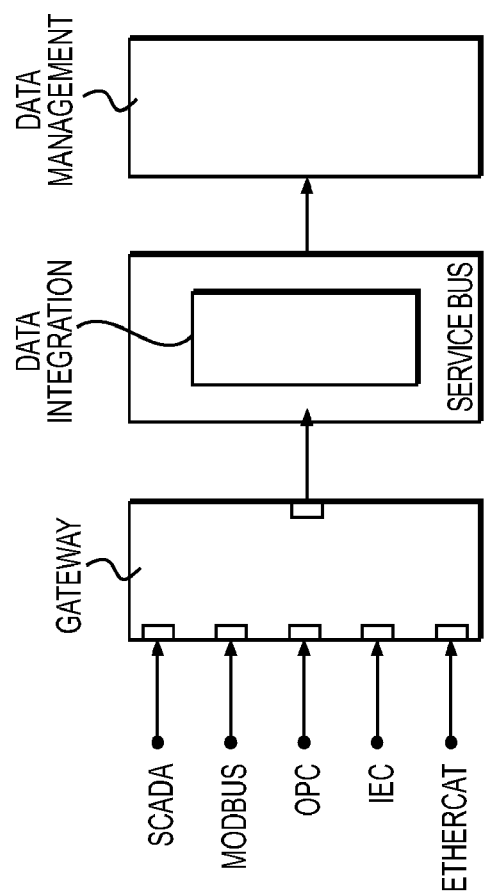
FIG. 7 illustrates an exemplary diagram of an interface in accordance with one embodiment of the disclosure.

FIG. 7 illustrates an exemplary diagram of an interface in accordance with one embodiment of the disclosure. As illustrated, the interface (gateway) receives data from one or more of a variety of sources. For example, the data collected from the upstream, midstream and downstream sensors that are processed by the SCADA systems is passed along to the gateway interface. In an alternative embodiment, the gateway replaces the industrial control system (such as SCADA) and collects data directly from the upstream, midstream and downstream sensors (FIG. 6). The gateway interface transforms (e.g. sorts, formats and modifies) the collected data into secure and formatted data that is compatible with the system, and in particular the data integration module, prior to being sent to the data management system for analysis by the global management system GMS.

Figure 8A:
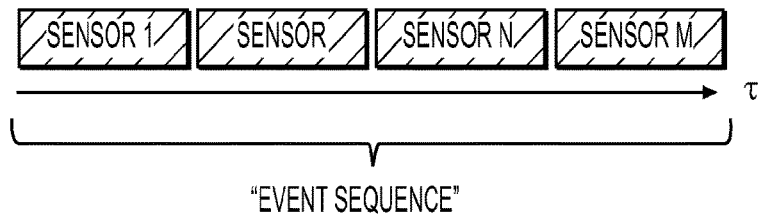
FIG. 8A-8D show an exemplary sequence of events in which the captured data occurs over time to determine a probability.
Figure 8B:
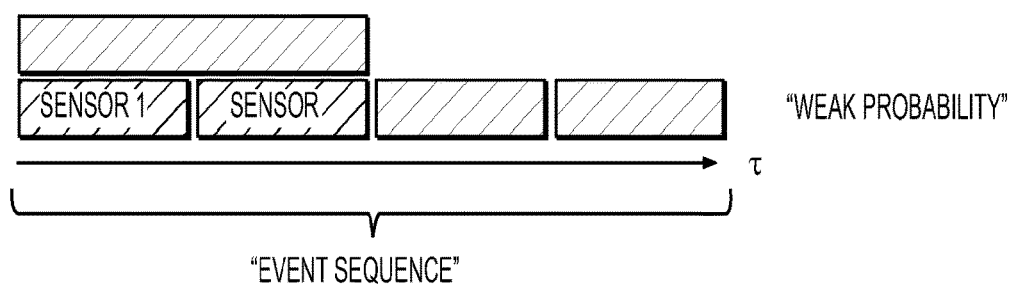
Figure 8C:
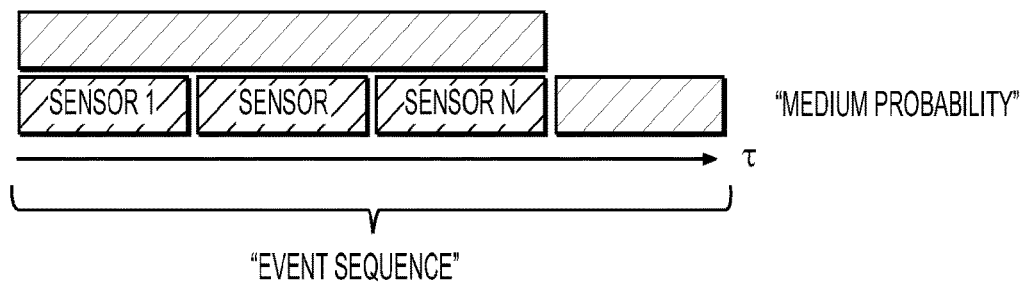
Figure 8D:
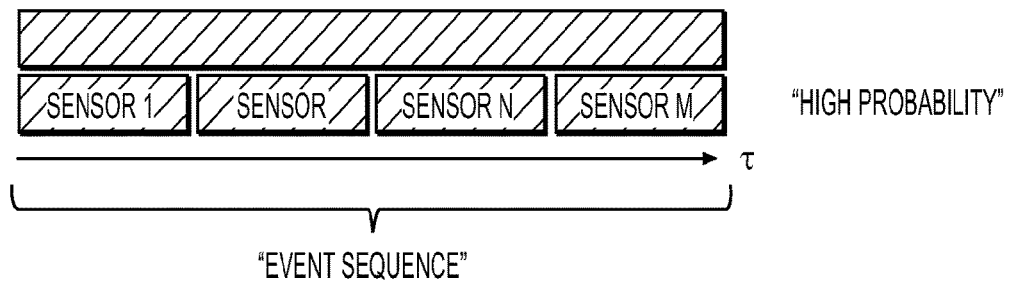

FIGS. 8A-8D illustrate exemplary sensor measurements and sensors collecting data along a supply chain in accordance with an embodiment of the disclosure. The control center CCC through the interface to the field and resource management (FIG. 6) can take a number of actions based on the real-time data and events received from the data management system. Once a particular sequence of measurements (or sequence of events) associated with an event description is known (i.e. learned by the prediction and prescription application, events can be flagged in real-time and sent to the control center CCC along with a probability score indicating the likelihood that a sequence of measurements unfolding will result in an identified event. In the figures, the shaded boxes represent the values received from a given sensor. FIG. 8A shows an exemplary number of sensors 1 . . . m that are configured to capture a sequence of events. FIGS. 8B, 8C and 8D show an exemplary sequence of events in which the captured data over the course of time t represents a weak probability, a medium probability and a high probability, respectively, of the event having occurred (termed here, the event probability).

The event probability is sent to the control center CCC along with a recommendation, such as "Theft possible in Pipeline Section 452, send intervention team to Sector D." The control center CCC may respond in any number of ways, including, but not limited to, the following: request additional data display for the indicated area in which the event (incident) has occurred; direct drones (UAVs) to the affected area for surveillance or capturing information or for visualization; dispatch intervention teams or humans (such as police, fireman . . . ) to the area to check out the event or what happens in the field; or order an evacuation of personnel in the field depending on what happens (for example explosion on site during petrol extraction).

To improve efficiency, using the predictive and prescriptive module, based on past events contained in historical data of measurements and events, patterns may be generated and used from the historical data to assist in predicting future events (incidents) before the sensors and data collectors begin to register data. Using this predictive data, the control center CCC and personnel operating the control center CCC could be alerted to predicted "hot areas" for theft identified by the system using data in the system, such as time of day, day of week, month or specific dates, weather conditions, previous event sequences, and the like. For example, based on a predicted "hot area," UAVs could be deployed to capture and display video, and intervention teams could be stationed nearby so that the event may be prevented. Or, if the event occurs, the intervention time will be reduced because the relevant resources are nearby. Additionally, the data management system may instruct the control center CCC to automatically display data from the "probable" areas where events are likely to occur, so that personnel may inspect the data and video from those areas to detect anomalies and activities in advance of any occurrence. The global management system GMS may also use a mix of data mining algorithms and human action to update system data based on events and analysis, with confirmation by personnel on the field or where problems have occurred.

It is appreciated from the above that that the global management system GMS is capable of recording the evolution of events, and link them together for providing a history to analyze and improve the data analysis in the data management system. Based on the prior knowledge of events having occurred in the past, historical data and verification that the events actually occurred, such as a hole being made in a pipeline such that fuel may be stolen, future events can be more accurately predicted and the events themselves may be better interpreted during monitoring and analysis. Additionally, the global management system GMS by virtue of its predictive and prescriptive nature is able to mitigate corruption by people, for example operating personnel in the control center CCC. Accordingly, it becomes increasingly difficult, for people involved with the illegal activities to avoid detection by deleting data, changing data, paying off personnel monitoring the data, etc.

Significantly, to avoid these types of situations from occurring, the global management system provides: secure and unforgeable data which may not be deleted, alerts based on the correlation of clustered events that give a high probability of illegal activity, which activity may be displayed to an operator and recorded as alerts that are also unforgeable and may not be deleted. Alternatively or additionally, the system itself may intervene in place of personnel to identify and send urgent information to external authorities such as police, fireman, etc. Accordingly, a part of the system is to supply an alternative to human error and inadequacies.

Further non-limiting examples of the global management system GMS, are provided below with respect to the midstream and downstream sectors. In the midstream sector, illegal activities typically occur by diverting or stealing materials. For example, in the pipeline of a supply chain, a hole can be made to pump petrol along the pipeline in an effort to steal, often successfully, the petrol. As countermeasures and in accordance with the objectives of the global management system GMS, the pipeline may be lined with several sensors and/or data collectors that will monitor and collect data from the pipelines. For example, speed of the flow, temperature, pressure, volume, etc. may be monitored and data collected. The collected data from the sensors and data collectors will be sent to the corresponding gateway (FIG. 6) or industrial control system ICS, and escalated to the data management system and on to the control center CCC, as described herein above. Additionally, the collected data should be updated in a manner that it may be interpreted to provide conclusions and recommendations. For example, if the sensor(s) or data collector(s) only measure the pressure in the pipeline every hour, when the fuel or crude oil is being illegally extracted, the sensor(s) and data collector(s) may not capture the illegal activity. If, on the other hand, the pressure in the pipeline is measured each minute, the sensor(s) and data collector(s) will be able to measure any increase or decrease in the pressure (or any other type of data, such as volume decrease, chemical presence of air or water) indicating that illegal activities are occurring. Linked with the localization of the sensor(s) and data collector(s), a drone or personnel could be sent automatically to the regional location, images could be captured from a local camera, and the police or emergency response personnel could be notified that the activities are underway.

Another non-limiting example of data in the midstream is a tanker truck transporting crude oil and petroleum. In this example, the collected data is GPS information generated by the trip made by the truck, and the volume of the content of the truck's tank. If the data collected over time indicates, for example, that the truck is stopping at a location longer than anticipated, or there is a variation of volume of the content of the tank, this may indicate that illegal activities are occurring or have occurred. In another example, the truck can be stopped at an overnight rest area. Since these areas are a known, regular stop for an extended period, volume sensors on the truck may be activated to monitor variations in the content of the tank. In a particular, it may be known that the particular region is known to have illegal activities. Together, any change in variation detected by the sensors can be escalated through the data management system to the control center CCC after the data has been analyzed. Authorities can be sent to the location if necessary, and the system's learning engines will become aware of the region and expectation of illegal activities in the area, and apply such knowledge in further analysis. The content (assets) could also be marked by chemical or forensic markers to retrieve them when for example, detected in a retail shop or by authorities.

In the downstream sector, a non-limiting example is provided in which collected data includes the volume produced in a refining factory. The volume data may be linked, for example, with the number of trucks required to transport the truck's content (fuel) to retails shops. As understood, once the fuel reaches the retail shops, it is unloaded into shop tanks for storage. Here, the volume is transferred and the fuel is distributed. Sensors and data collectors may then be used to measure the corresponding volumes exchanged, and cash generated by the sale of fuel. If the volumes and sales do not match, this could indicate illegal activities, such as embezzlement. This information may also be useful for tax recollection or reconciliation, to estimate the amount of fuel required in a particular region, etc. As appreciate, the data is not only collected, but also stored in a repository and transformed into a sum of clustered events that may be linked, used or analyzed for prescriptive or predictive action.

Figure 9:
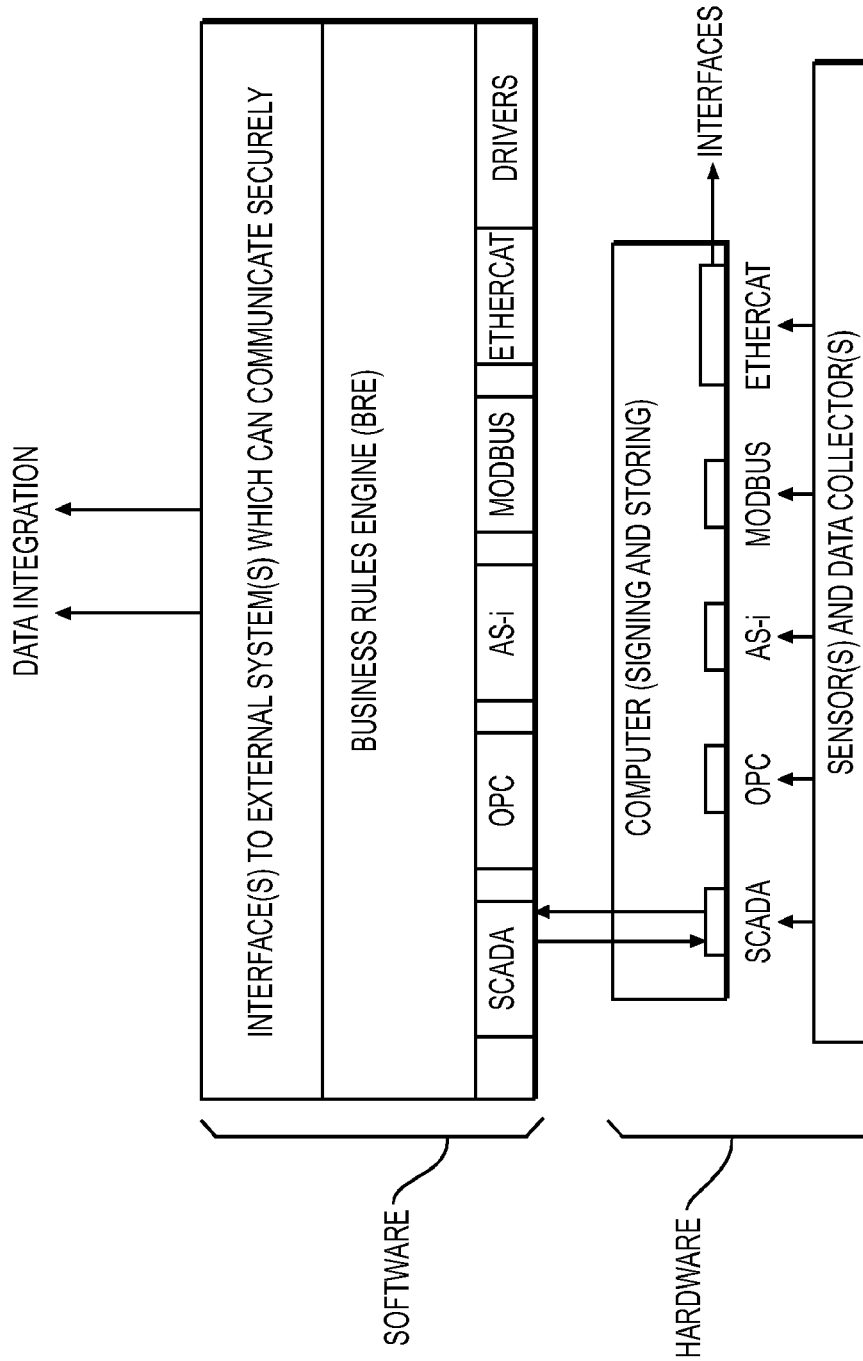
FIG. 9 is an exemplary diagram of an interface in accordance with one embodiment of the disclosure.

FIG. 9 is an exemplary diagram of an interface in accordance with one embodiment of the disclosure. The interface, in this application also referred to as the Gateway or Gateway interface, interfaces the data sensors that are positioned along the upstream, midstream and downstream sectors to external sources, such as an enterprise service bus ESB or the data global management system GMS via the data integration module. As illustrated, the gateway is divided into three layers including: (1) the compturer (for signing and storing) which communicate with industrial control systems (such as SCADA, OPC, AS-i MODBUS and Ethercat). The drivers may be a combination of physical interfaces and software, (2) the business rules engine (BRE) which correlates, secures, authenticates, filters, reconciles, provides unforgeability, and creates key value data. The BRE will also from the data collected, make association of data collected into objects, create events based on non-integrity of objects, create events-based alert or events-based on thresholds or on business rules or on trends, and (3) the interfaces that interface with the external systems using, for example, HTTPS, SSL or any other known software or hardware protocol.

The gateway interface provides, among other features, a mechanism to manage the collected the data into a format that is further secured and which is compatible with the external system to which the transformed data or objects or events or alerts created in the Gateway will be sent. For example, the gateway interface will secure the collected data from the sensors and/or data collectors as well as formatting the collected data to be compatible with the data integration system before being used in the global management system GMS especially at the Data Management System (DMS) level. The gateway interface interfaces with external systems using, for example, protocols such as HTTPS, SSL, etc. External interfaces include, but are not limited to, an enterprise service bus ESB or an industrial control system ICS, such as the gateway management system GMS described herein.

At the driver layer, the drivers which communicate with external systems, such as the ICS system, may be hardware, software or any combination therefore. The hardware and software is preferably tamper resistant and secure in order to avoid attacks on the physical hardware as well as malicious attacks on the software, for example by hackers, injection of unwanted data or the like. The data that will be generated and created in the gateway interface will be more secure and provide enhanced properties in addition to those collected from the various repositories of data, such as the SCADA or ICS. The secure and enhanced data will then be provided to the global management system GMS and assist in creating the clustered events. The gateway will also verify that data being received from the sensor(s) and data collector(s) are authentic data and have not been corrupted by external sources or otherwise. That is, the gateway will first have the capability to authenticate data being received before securing the data and adding additional properties. This will ensure that the data to be secured and enhanced is authenticated prior to being passed to the global management system GMS, and will avoid corrupted data being sent to the global management system GMS. One weakness of existing systems in the oil and gas supply chain is the incredibly large volume of data. If the system becomes contaminated or infected with fake, counterfeit, fabricated or inaccurate data, the data captured will not be reliable and any events or clustered events created in the global management system GMS may potentially compromise the alerts generated from the clustered events. Accordingly, any data to be accessed or used in the global management system GMS (via the data integration module), using the gateway, should be as secure and accurate as possible. An example of authenticating the data that will be inserted in the gateway, is to capture from the sensors, several times the information it is supposed to capture and in a short period of time and verifying that the data collected is always of the same nature (e.g. the temperature is captured ten times during 30 seconds and the value is quite the same, then the data seems to be correct). Another example of authenticating or being sure that the data is accurate is to add to the sensor an electronic system or mechanism that protect him from tampering or diversion and protect the access to the sensor by any means, the data collected from the sensor and then send to the gateway will be accurate as possible.

The gateway interface collects data either via the physical interfaces to industrial sensors utilizing industrial communication protocols, such as OPC or Ethercat, or via virtual (i.e. software) interfaces to existing monitoring or control systems, such as SCADA. The interfaces are powered, for example, using software drivers which can be dynamically loaded or unloaded depending on the physical or virtual requirements. For example, if there are three OPC powered devices and an Ether cat device physically attached, then there would be three OPC drivers and a single Ethercat driver.

Once the data reaches the gateway interface, the Business Rules Engine BRE create new monitoring data by correlating captured data, filtering irrelevant data, for example non-security related events, validating read/write access to/from the driver layer to the integration layer (in both directions), and applying security/access/authentication rules, using an external system if necessary. It is appreciated, however, that these functions are only exemplary and the BRE is not limited to such functions.

At the interface layer, the software in the gateway interface may also interact with external systems based on the monitoring requirements. For example, the interface may include an email interface, a web interface, etc. The interface layer may also interface with the enterprise service bus ESB as a messaging system (for example, utilizing a protocol such as REST over HTTPS) to integrate data from all gateway interfaces and external systems into the data storage component of the global management system GMS. It is also appreciated that although the diagram illustrates an interface to the gateway interface, the gateway interface may also be directly connected or a part of global management system GMS.

The enterprise service bus ESB software is a messaging system similar to the IBM™ products MQueue Series and BMC Control. The ESB software, which in the instant embodiment is referred to as the data integration module part of the global management system GMS (although it is appreciated that the ESB could also be a separate entity), could be application such as Open ESB developed by Sun Microsystems™ or WSO2 ESB. A JAVA based programming language may be used as the programming language to achieve such software.

The Business Rules Engine BRE, the second layer, acts as the transformation processing of the captured data and applies rules which can be configured to represent a particular element of interest, such as a potential security incident. The BRE monitors all activities and measuring points of all the drivers loaded, along with any physically or virtually connected devices. By accessing all of these measuring points in real time, the BRE can create new measuring points or data useful to create clustered events in the global management system GMS. The BRE will also from the data collected, make association of data collected into objects, create events based on non-integrity of objects, create events-based alert or events-based on thresholds or on business rules or on trends. For example, measuring point A on a physically connected device (such as a temperature sensor) and measuring point B (such as a variable from an external software SCADA system) under specific thresholds can create new data based on both measuring point A and measuring point B. For example new data C may be created, where the new C data is an appendage of measuring points A and B and which can constitutes an event. This enables the BRE to correlate data for a better understanding of events as they occur. The events generated in the Gateway are based on the data collected from sensors, data collector or ICS systems. To these data which have been checked in their accuracy before entering in the Gateway, addition of attributes to the data to obtain enhanced data is made.

Another possibility, if the sensors, data collectors or ICS systems are not reliable or able to check the accuracy of the data, this step of checking is made in the Gateway. The events created in the Gateway will be useful in the DMS of the GMS to create the clustered events. Said clustered events are used in the GMS to create and/or display alerts at the CCC level and will allow in the context of the present invention to mobilize efficiently the corresponding field intervention (i.e., police when theft of material, fireman if explosion . . . ).

The BRE may also act autonomously if enough physical and/or virtual information is available to determine, based on data collected events useful for creating in the global management system GMS clustered events without reliance on any external system, the clustered events will be useful to determine actions such as notifications to identify or alert security incidents and other actions. Definition(s) of the clustered events is managed via the data management module of the global management system GMS as part of the "learning" nature of the system. The BRE stores and queues, when necessary, these data and encrypts or signs each data to ensure the data is complete, authentic, accountable, non-repudiated, and protected from external access, modification, disruption and destruction. It is appreciated that any one or more, none or all of these features may be used, in addition to another form of functionality. The encrypted data may then be accessed by external systems based on, for example, security profiles of the system requesting the information.

Figure 10:
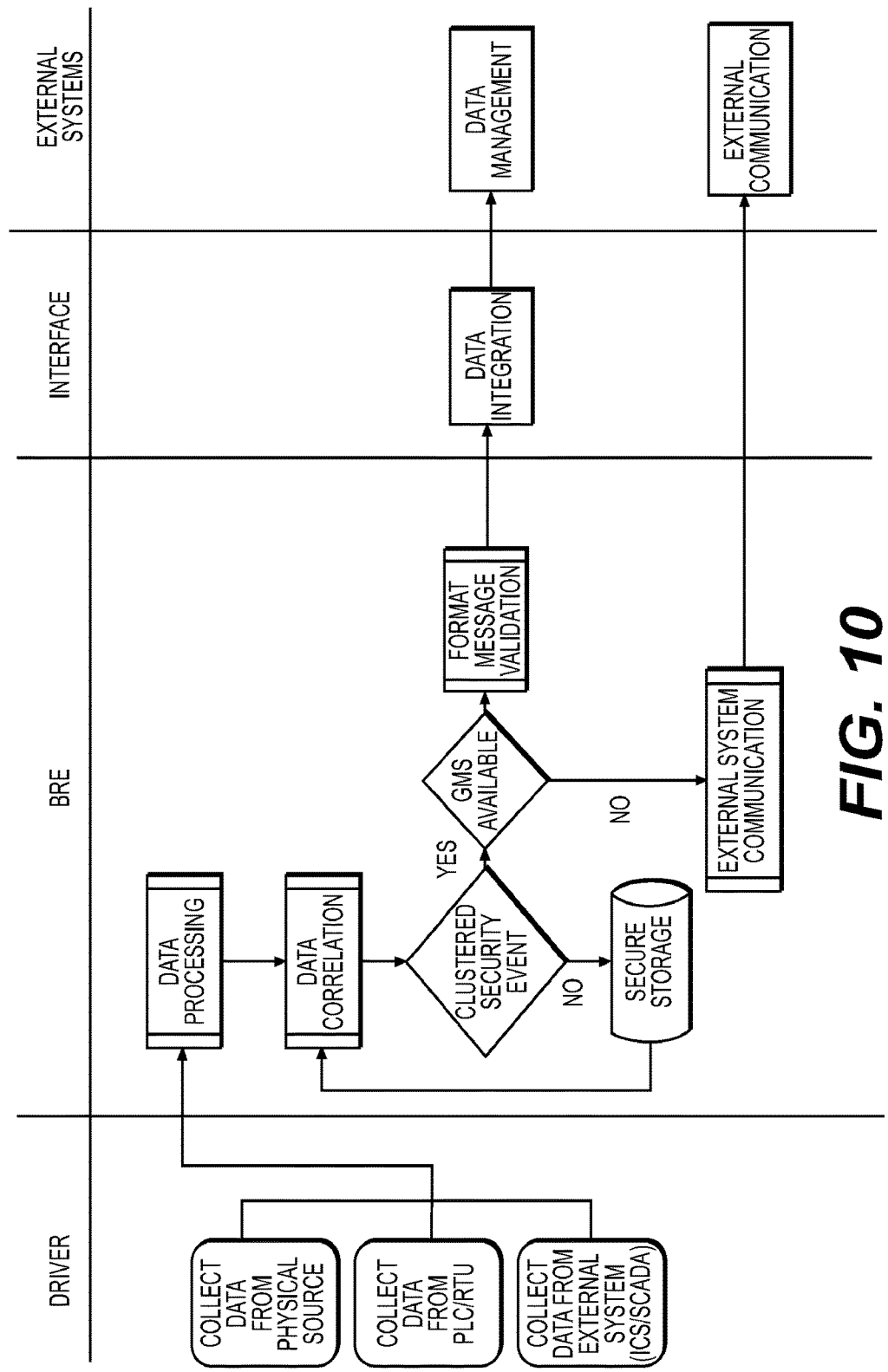
FIG. 10 is an exemplary embodiment of a process flow of the interface in accordance with one embodiment of the disclosure.

FIG. 10 is an exemplary embodiment of a process flow of the interface in accordance with one embodiment of the disclosure. The drivers of the gateway interface collect data from a variety of sources including, but not limited to, physical sources, programmable logic control (PLC) and remote terminal units (RTU) and any other type of source. The business rules engine BRE processes the data, correlates the data and creates from the data events or a sequence of events, as described in detail above. The data and events are optionally signed by a Hardaware or software security module (HSM or SSM) Events and enhanced data may be stored in a secure repository or data storage. The gateway then checks to determine where the data will be sent (GMS available), for example to the global management system GMS or another external system. If the global management system GMS is available, then the data or events are formatted and validated for use by the global management system. Data going to an external system may or may not be formatted and validated depending on the external system requirements. Data or events being passed to the global management system GMS is sent to the data integration module, which stores the data or the events, acquires the data from storage, creates for example a key value data structure from the data, sorts the structure data and analyzes the structured data using computational models and algorithms to identify correlation between data useful for the creation of clustered events in the global management system GMS. The data is also checked for integrity of the structured data and the security of the structured data to prevent tampering. The data interface may be an independent interface or part of the data management system. If separate, the data is then passed along to the data management system for processing in accordance with the embodiments described above.

Accordingly, the present disclosure provides various systems, servers, methods, media, and programs. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of generating data in an oil and gas supply chain for compatibility with external systems, comprising:
    capturing collected data from at least one of an industrial control system, sensor and data collector;
    signing and storing the collected data in a secure intermediary hardware platform comprising at least one software component; and
    adding attributes to the collected data using a business rules engine to create enhanced data useful in a global management system, wherein the additional attributes of the enhanced data include at least one of a secure attribute allowing detection of modification or corruption and authentication, and
    wherein the method comprises authenticating the collected data by acquiring several times from the at least one of the industrial control system, sensor and data collector, averaging the collected data and verifying whether the collected data is of the same nature, prior to being transferred to the secure intermediary hardware platform.

2. The method according to claim 1, wherein at least part of the enhanced data created using the business rules engines are transformed into events.

3. The method according to claim 2, wherein the enhanced data or the events based on the enhanced data are signed or encrypted with at least one of hardware or software security module(s).

4. The method according to claim 1, further comprising securely collecting the collected data from at least one of the industrial control system, sensor and data collector.

5. The method according to claim 1, further comprising protecting the secure intermediary hardware platform from at least one of tampering, injection of unwanted data and unauthorized access.

6. A system for generating data in an oil and gas supply chain for compatibility with external systems, comprising:
    at least one of an industrial control system, sensor and data collector to capture collected data;
    a secure intermediary hardware platform for signing and storing the collected data to interface with at least one software component;
    a business rules engine adding attributes to the collected data to create enhanced data useful in a global management system, wherein the additional attributes of the enhanced data include at least one of a secure attribute allowing detection of modification or corruption and authentication, and
    wherein the system is configured to authenticate the collected data by acquiring several times from the at least one of the industrial control system, sensor and data collector, averaging the collected data and verifying whether the collected data is of the same nature, prior to being transferred to the secure intermediary hardware platform.

7. The system according to claim 6, wherein the enhanced data created using the business rules engines are transformed into events.

8. The system according to claim 7, wherein the enhanced data or the events based on the enhanced data are signed or encrypted with at least one of hardware or software security module(s).

9. The system according to claim 6, wherein the collected data from at least one of the industrial control system, sensor and data collector are collected in a secure manner.

10. The system according to claim 6, wherein the secure intermediary hardware platform is protected from at least one of tampering, injection of unwanted data and unauthorized access.

11. A non-transitory computer readable medium storing a program to generate data in an oil and gas supply chain for compatibility with external systems, the program when executed by a processor, comprising:
    capturing collected data from at least one of an industrial control system, sensor and data collector;
    signing and storing the collected data in a secure intermediary hardware platform to interface with at least one software component; and
    adding attributes to the collected data using a business rules engine to create enhanced data useful in a global management system, wherein the additional attributes of the enhanced data include at least one of a secure attribute allowing detection of modification or corruption and authentication, and
    wherein the program comprises authenticating the collected data by acquiring several times from the at least one of the industrial control system, sensor and data collector, averaging the collected data and verifying whether the collected data is of the same nature, prior to being transferred to the secure intermediary hardware platform.

12. The non-transitory computer readable medium according to claim 11 wherein the enhanced data created using the business rules engines are transformed into events.

13. The non-transitory computer readable medium according to claim 12, wherein the enhanced data or the events based on the enhanced data are signed or encrypted with at least one of hardware or software security module(s).

14. The non-transitory computer readable medium according to claim 11, further comprising securely collecting the collected data from at least one of the industrial control system, sensor and data collector.

15. The non-transitory computer readable medium according to claim 11, further comprising protecting the secure intermediary hardware platform from at least one of tampering, injection of unwanted data and unauthorized access.

* * * * *